United States Patent

Dungan et al.

[11] 4,029,393
[45] June 14, 1977

[54] INTEGRATED THERMALLY COMPENSATED LIQUID CRYSTAL DISPLAY DEVICE

[75] Inventors: Dennis F. Dungan; Adolph L. Micheli, both of Mount Clemens, Mich.

[73] Assignee: General Motors Corporation, Detroit, Mich.

[22] Filed: Apr. 29, 1976

[21] Appl. No.: 681,472

[52] U.S. Cl. .................... 350/160 LC; 338/22 R
[51] Int. Cl.² ............................................ G02F 1/13
[58] Field of Search ..... 350/160 R, 160 P, 160 LC; 338/22 R, 22 SD

[56] References Cited
UNITED STATES PATENTS

| | | |
|---|---|---|
| 3,499,112 | 3/1970 | Heilmeier et al. ........ 350/160 LC X |
| 3,604,930 | 9/1971 | Allen ....................... 350/160 LC X |
| 3,770,961 | 11/1973 | Westell .................... 350/160 LC X |
| 3,876,861 | 4/1975 | Wightman et al. ........ 338/22 SD X |
| 3,940,591 | 2/1976 | Teng ............................ 338/22 R X |

Primary Examiner—Edward S. Bauer
Attorney, Agent, or Firm—Robert J. Wallace

[57] ABSTRACT

A reflective mode liquid crystal cell having an integral self-actuating heater for maintaining a liquid crystal material in the cell above a temperature at which it solidifies. In this cell, the liquid crystal material is disposed between a transparent member, and a member having a nontransparent barium titanate portion. The barium titanate positive temperature coefficient of electrical resistance has a preselected Curie temperature above the temperature at which the liquid crystal material solidifies. A single power source can be used for electro-optic display, and heat generated by current flow through the barium titanate.

3 Claims, 2 Drawing Figures

INTEGRATED THERMALLY COMPENSATED LIQUID CRYSTAL DISPLAY DEVICE

BACKGROUND OF THE INVENTION

This invention relates to liquid crystals, and more particularly to an improved reflective mode liquid crystal cell construction.

It is already known that a given liquid crystal material exists in the liquid crystal phase over only a limited temperature range. Below this range these materials are generally solids and above this range they are ordinary isotropic liquids. Many of the earliest liquid crystal materials exhibited their liquid crystal characteristics only within a very limited range above room temperature. Through continued development, many materials are now available that exhibit liquid crystal characteristics over considerably wider range. Thus, many materials are now available for use as liquid crystals from room temperature to well over 100° C. Therefore, elevated ambient temperatures normally do not present a problem with respect to liquid crystal devices.

On the other hand, there are few materials which exhibit liquid crystal characteristics significantly below room temperature and, of those which do, viscosities are generally so high at low temperatures that response times for devices using them are undesirably long. Accordingly, liquid crystal displays have been limited chiefly to moderate ambient temperature applications, as for example calculator displays, wrist watch displays, etc.

If a liquid crystal display is to be subjected to ambient temperatures colder than room temperature, it may have to be heated to be satisfactorily operative. This is particularly true for displays subjected to the winter temperature extremes of temperate and polar climates. In such climates, exterior visual displays, automobile instrument panels, and the like, would require means for maintaining the liquid crystal display device above unduly low ambient temperatures. Providing such temperature protection is not an easy matter. For commercial practicality, the heating means must be more than just effective to protect against moderately low weather temperatures. For example, in automotive applications it must even be adequate at temperatures as low as minus 40° C. However, it must also be low in initial cost and efficient to operate. In addition, particularly for automotive applications it should be simple, rugged and reliable, requiring virtually no maintenance in use. Still further this heating means must not significantly limit the visual display function of the liquid crystal cell. Thus, separate heated enclosures for the liquid crystal cell are not generally desirable.

We have found a very simple and effective way to provide low temperature protection to a reflectance mode electro-optic liquid crystal display device. It involves a liquid crystal cell having an integrated self-actuating heating element. It does not require a separate enclosure or other composite type of structure to provide low temperature protection. Moreover, in many applications it does not require a separate heater power supply or control, and even shares electrical connections with electro-optic electrodes of the device.

OBJECTS AND SUMMARY OF THE INVENTION

It is, therefore, a principal object of this invention to provide an improved reflectance mode electro-optic liquid crystal display cell having an integrated self-actuating heater for low temperature protection.

A further object of this invention is to provide a simple, reliable and lower cost liquid crystal cell for use at colder ambient temperatures, such as for outside visual displays, automotive instrument panels, and the like.

In our improved reflective mode liquid crystal cell, the liquid crystal material is disposed between a transparent member, and a reflective member having a barium titanate portion. The barium titanate has a predetermined positive temperature coefficient of electrical resistance, and a selected Curie temperature within the temperature range for the liquid crystal phase of the liquid crystal material. Electrodes on the facing surfaces of these members provide the electro-optic effect in the usual manner. For example, at least one of the electrodes is segmented with selective actuation of electrode segments providing the visual display. Two spaced electrodes contacting the barium titanate provide thermistor-like heating of the cell. One of these latter electrodes can be in common with the electro-optic effect electrodes, and both electrode pairs can share the same power source.

BRIEF DESCRIPTION OF THE DRAWING

Other objects, features and advantages of the invention will become more apparent from the following description of preferred embodiments thereof and from the drawing, in which.

Figure 1:
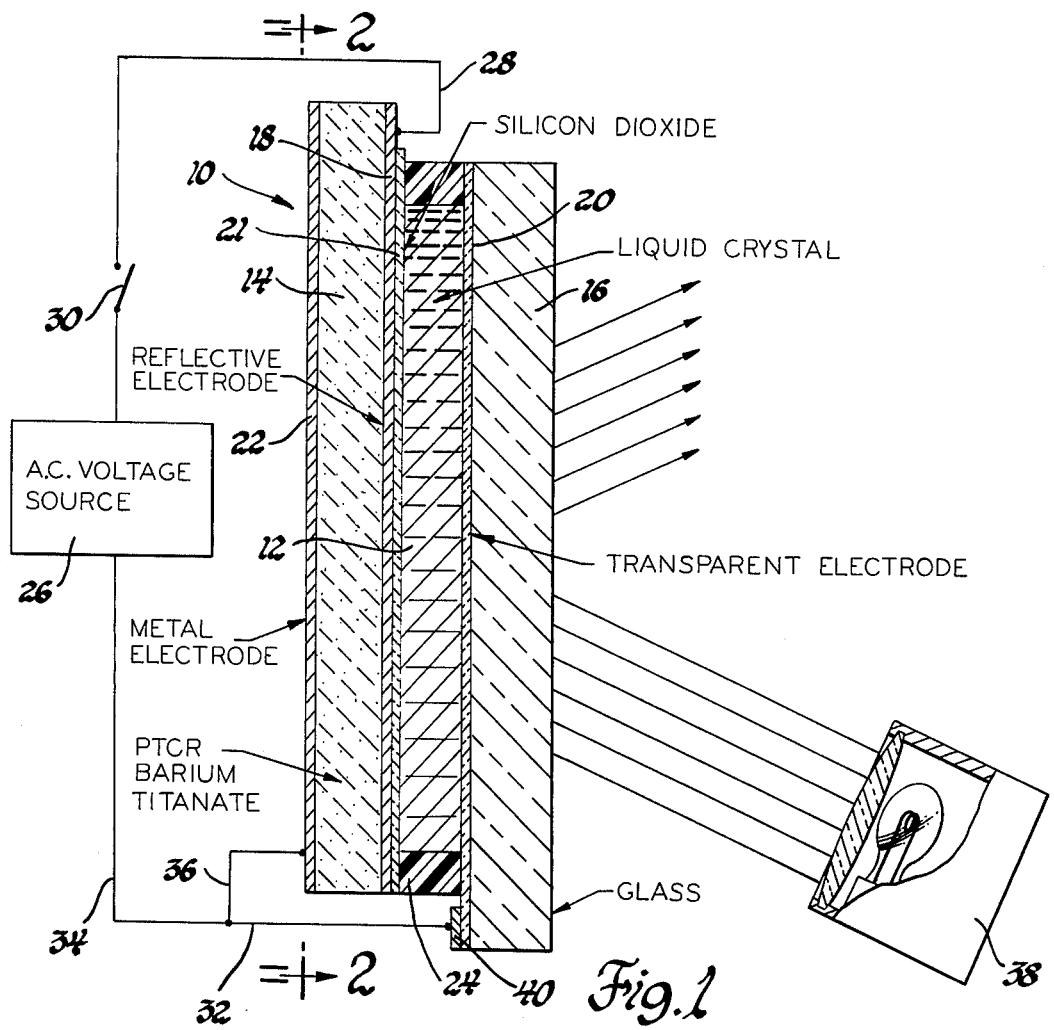
FIG. 1 is a schematic cross-sectional view of a liquid crystal cell made in accordance with the invention. The section is taken along the line 1—1 of FIG. 2.
Figure 2:
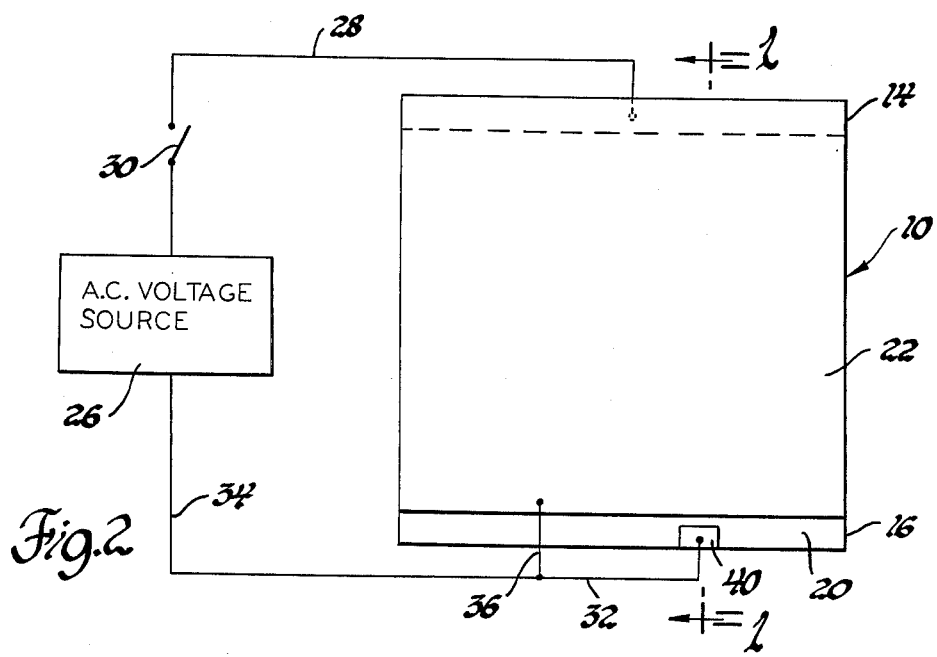
FIG. 2 is an elevational view along the line 2—2 of FIG. 1.

DESCRIPTION OF THE PREFERRED EMBODIMENTS:

FIGS. 1 and 2 show a liquid crystal cell designated by reference numeral 10 in the form of an electro-optic device. The device comprises a liquid crystal material 12 sandwiched between a plate 14 of modified barium titanate and a plate 16 of glass. Barium titanate plate 14 is 2.5 cm long, 1.3 cm wide and 0.16 cm thick. It has a 5 ohm resistance through its thickness below its ferroelectric Curie temperature. The liquid crystal material of this example is a nematic liquid crystal p-(methoxy benzylidene)-n-butylaniline, popularly referred to as MBBA, containing up to 0.5% by weight octadecylmalonic acid. However, other nematic liquid crystals can be used, as well as those of the smectic and cholesteric type. In effect any liquid crystal useful in a reflectance mode electro-optic device can be used in this invention.

Plate 14 is made of barium titanate modified in that it contains about 25 mole percent strontium oxide, so that it has a positive temperature coefficient of electrical resistance with a Curie temperature of about 20°-30° C. Other dopants which will produce a selected positive temperature coefficient of resistance (PTCR) in barium titanate are lanthanum, niobium, antimony, bismuth, etc. Below its Curie temperature, the PTCR barium titanate plate has a sufficiently low resistance through its thickness to permit electrical current flow. The PTCR barium titanate self heats due to the current flow, which in turn raises resistivity of the barium titanate. As resistivity of the PTCR barium titanate increases, resistance of the plate 14 rises to lower current flow. As resistance rises the current flow decreases, decreasing the rate of self-heating until an equilibrium is reached and temperature remains constant. This is the Curie temperature. It is preferred that there be a sharp increase in resistivity at the Curie temperature to insure a sharp drop in current, and therefore heating. Plate 14 reaches its Curie temperature in less than 10 seconds at 12 volts and an ambient temperature of minus 40° C. The speed of heating is a function of size, voltage, plate resistance, Curie temperature, etc. Other concentrations of strontium oxide can produce barium titanate compositions having a positive temperature coefficient of electrical resistance with other Curie temperatures. The PTCR barium titanate plate is formed in the known and accepted manner, as for example by pressing a mixture of barium titanate and strontium oxide powders in a steel die. The plate thus formed is then fired in air.

An evaporated nickel layer 18 having a high degree of reflectivity is on the surface of the PTCR barium titanate plate 14 facing glass plate 16. Other metals that provide a reflective coating can be used, including vacuum evaporated aluminum. The metal can be of any thickness and applied in any convenient manner. In this example the nickel layer is about 1000 angstroms thick and applied by vacuum evaporation techniques. A thickness of about 1000-3000 angstroms can be used.

While glass is used for plate 16, any other material of like transparency can be used. A transparent electrically conductive coating 20 is on the surface of glass plate 16 facing the PTCR barium titanate plate 14. The transparent electrode can be made of a 1000-3000 angstrom thick film of tin oxide, indium oxide, or the like. Reflective coating 18 and transparent coating 20 are in contact with the liquid crystal material 12 between the plates 14 and 16 and serve as complementary electro-optic control electrodes.

If desired, lifetime of the liquid crystal cell 10 can be improved if a thin dielectric layer 21 covers the nickel electrode 18. The layer 21 prevents electrical conduction between nickel electrode 18 and the liquid crystal 12. It can be a silicon dioxide layer about 1000-3000 angstroms thick.

A nickel coating 22 on the opposite face of barium titanate plate 14 provides an additional electrode for cooperation with the first nickel electrode 18. Nickel coating 22 can be of any conductive material, and if of metal is at least 1000 angstroms thick. It can be applied in any of the normal and accepted manners, including vacuum evaporation, electroless deposition, and silk screening of a thick film cermet conductor. Electrode segmentation for alpha-numeric visual display is done in the usual manner. For example, at least one of electrodes 18 and 20 should be appropriately segmented, and the segments connected to a power source through selective switching means (not shown).

PTCR barium titanate plate 14 and glass plate 16, and their adherent coatings 18 and 20, are spaced from one another by means of an annular teflon spacer 24. However, it is to be understood that other nonconductive materials can be used for spacer 24. Teflon spacer 24 forms a closed chamber in conjunction with plates 14 and 16. The chamber is completely filled with the liquid crystal 12 so that it maintains contact with electrodes 18 and 20 at all cell attitudes. Spacer 24 is of an appropriate thickness to provide an electrode spacing and attendant liquid crystal mixture thickness, of about 10-1000 microns.

Electrodes 18 and 20 are connected across an alternating current voltage source 26. Electrode 18 is connected to the voltage source 26 via lead 28 and switch 30. Electrode 20 is connected to the voltage source 26 via leads 32 and 34. The additional electrode 22 is connected to the same side of the alternating current voltage source 26 as transparent electrode 20 and is connected in parallel with electrode 20 through lead 36 which in turn is connected to lead 34. Voltage source 26 has a frequency that can be varied from about 10 to 1500 hertz. The threshold voltage for the liquid crystal device is slightly over 4 volts. Accordingly, the usual operating voltage is about 5-25 volts, depending on the frequency of the alternating current, the electrode spacing, the specific liquid crystal material involved, etc. A source 38 of ordinary light shines on the cell 10, and reflects off the cell in the usual manner to produce a visual display.

It should be noted that leads 28 and 36 are soldered directly to their respective electrodes, while a discrete soldering pad 40 is provided for attachment of lead 32 to electrode 20. Depending on the thickness and composition of electrodes 18 and 22, it may be desirable to provide discrete pads for attachment of leads on these electrodes too.

Both of the PTCR barium titanate plates 14 and the glass plate 16 are shown as planar members having major surfaces which are flat and parallel. It is not necessary that all portions of these members be flat, only the optically functioning portions. For example, it may be desirable to make peripheral portions of these members with suitable conformations that facilitate assembly of the cell, mounting of the cell, sealing of the cell, and the like. These members are shown as completely flat merely to focus better on the improvements of this invention. Analogously, plate members 14 and 16 are shown to have major surfaces. It is to be understood that they can be produced in any shape and size desired.

We claim:
1. A reflective mode liquid crystal cell having an integral heater that is self-actuating below a predetermined ambient temperature to permit liquid crystal displays at lower ambient temperatures without significantly increasing the complexity of the liquid crystal cell or a system including it, said reflective mode liquid crystal cell comprising:

a first member having a substantially flat surface portion thereon formed of barium titanate having a preselected positive temperature coefficient of electrical resistance;

a reflective electrically conductive coating on said barium titanate flat surface portion serving as one liquid crystal electrode;

a second member adjacent to said first member and having a transparent portion with a substantially flat surface facing said barium titanate surface portion, said transparent portion flat surface and said barium titanate flat surface portion being mutually spaced and substantially parallel;

a conductive transparent coating on said second member transparent portion flat surface serving as a complementary liquid crystal electrode;

a liquid crystal between said first and second members that exhibits an electro-optic effect in response to a voltage applied between said reflective and transparent coatings;

means retaining said liquid crystal between said members; and at least one additional electrically conductive coating on said barium titanate spaced from said reflective electrode and serving as an additional electrode for maintaining a preselected electrical potential across said barium titanate plate that produces a significant electrical current flow therethrough and an attendant electrical heating therein only at ambient temperatures below a predetermined temperature, whereby said liquid crystal is maintained above said predetermined temperature without external control.

2. A reflective mode liquid crystal cell having an integral heater that is self-actuating below a predetermined ambient temperature to permit liquid crystal displays at lower ambient temperatures without significantly increasing the complexity of the liquid crystal cell or a system including it, said reflective mode liquid crystal cell comprising:

a barium titanate generally plate-like member having a preselected positive temperature coefficient of electrical resistance, said member having a predetermined thickness commensurate with its specific resistivity and rate of change thereof with temperature to present a low electrical resistance below a predetermined temperature and a high electrical resistance above said predetermined temperature;

a reflective electrically conductive coating on one major surface of said barium titanate member serving as a combination heating and electro-optic electrode;

a transparent generally plate-like member spaced adjacent said barium titanate member with its major surfaces generally parallel thereto;

a conductive transparent coating on the major surface of the transparent member facing the barium titanate member and serving as a complementary electrode to said combination electrode;

at least one of said combination and complementary electrodes being appropriately segmented for producing a selected alpha-numeric display;

a dielectric coating completely covering at least one of said combination and complementary electrodes in areas where it could contact a liquid crystal composition, whereby electrical conduction through said liquid crystal is inhibited;

a liquid crystal between said plate-like members and extending from the coating on one member to the coating on the other member;

means retaining said liquid crystal between said plate-like members and in contact with said coatings for producing an electro-optic effect in said liquid crystal; and an electrode on the opposite major surface of said barium titanate member for maintaining a preselected electrical potential across the thickness of said barium titanate that produces an electrical current flow therethrough and attendant electrical heating therein only at ambient temperatures below said predetermined temperature, whereby said liquid crystal between said plate-like members is maintained above said predetermined temperature without external control.

3. A reflective mode liquid crystal cell having an integral heater that is self-actuating below a predetermined ambient temperature to permit liquid crystal displays at lower ambient temperatures without significantly increasing the complexity of the liquid crystal cell or a system including it, said reflective mode liquid crystal cell comprising:

a barium titanate generally plate-like member having a preselected positive temperature coefficient of electrical resistance, said member having a predetermined thickness less than about 0.2 cm that is commensurate with its specific resistivity and rate of change thereof with temperature, so as to present electrical resistance of the order of 5 ohms and significant electrical heating therein below a predetermined temperature and an electrical resistance above said predetermined temperature that restricts electrical heating therein;

a reflective electrically conductive coating about 1000–3000 angstroms thick on one major surface of said barium titanate member serving as a combination heating and electro-optic electrode;

a transparent generally plate-like member with one major surface spaced about 10–10,000 microns away from said barium titanate member and generally parallel thereto;

a conductive transparent coating about 1000–3000 angstroms thick on the major surface of the transparent member facing the barium titanate member and serving as a complementary electrode to said combination electrode;

at least one of said combination and complementary electrodes being appropriately segmented for producing a selected alpha-numeric display;

a dielectric coating about 1000–3000 angstroms thick covering at least one of said combination and complementary electrodes in areas where it could contact a liquid crystal composition, whereby electrical conduction through said liquid crystal is inhibited;

a liquid crystal between said plate-like members and extending from the coating on one member to the coating on the other member, means retaining said liquid crystal between said plate-like members and in contact with said coatings for producing an electro-optic effect in said liquid crystal;

an electrode on the opposite major surface of said barium titanate member for maintaining a preselected electrical potential across the thickness of said barium titanate that produces an electrical current flow therethrough and attendant electrical heating therein only at ambient temperatures below said predetermined temperature, whereby said liquid crystal between said plate-like members is maintained above said predetermined temperature without external control; and means for applying a voltage of one polarity to said combination electrode while simultaneously applying a voltage of opposite polarity to both of said complementary electrode and said opposite surface barium titanate electrode.

* * * * *